US005766775A

United States Patent [19]

Kijima et al.

[11] Patent Number: 5,766,775

[45] Date of Patent: Jun. 16, 1998

[54] DECORATIVE LIGHTING MATERIAL AND A MANUFACTURING METHOD THEREOF

[75] Inventors: Toshihiro Kijima; Kazunobu Nemoto, both of Tokyo, Japan

[73] Assignee: Nisshinbo Industries, Inc., Tokyo, Japan

[21] Appl. No.: 519,286

[22] Filed: Aug. 25, 1995

[30] Foreign Application Priority Data

Aug. 26, 1994 [JP] Japan .................................... 6-225618

[51] Int. Cl.[6] ...................................................... B32B 29/00

[52] U.S. Cl. ........................ 428/537.5; 428/480; 428/481; 428/500; 428/507; 428/511; 428/512; 428/513; 428/514; 427/207.1; 427/256; 427/258; 427/261; 427/264; 427/27; 156/325; 156/326

[58] Field of Search .................................... 428/500, 507, 428/511, 512, 513, 514, 537.5, 480, 481; 427/207.1, 256, 258, 261, 264, 271; 156/325, 326

[56] References Cited

U.S. PATENT DOCUMENTS 3,928,697 12/1975 Mallinson .

FOREIGN PATENT DOCUMENTS 2 253 623 7/1975 France .
5229244 9/1993 Japan .

*Primary Examiner*—Leszek Kiliman
*Attorney, Agent, or Firm*—Nikaido Marmelstein Murray & Oram LLP

[57] ABSTRACT

The present invention provides a decorative lighting paper in which the printed matter can be easily discerned with clarity whether viewed with transmitted light or reflected light, and a method of manufacturing the said paper thereof. The paper according to the present invention comprises a substrate and a coating layer formed on at least one side of the substrate, the overall opacity of the paper being in the range of 50–75%, the brightness as measured from the one side is 80% or more, and the luster of the paper is 5–23%.

23 Claims, 1 Drawing Sheet

DECORATIVE LIGHTING MATERIAL AND A MANUFACTURING METHOD THEREOF

BACKGROUND OF THE INVENTION

1. Field of the Invention

This invention relates to decorative lighting material, which when printed on both sides, the design thereof can be discerned by transmitted and/or reflected light, and to a method for manufacturing said material.

2. Description of the Related Art

A decorative lighting type of sign board is gaining popularity for display purposes. A light source is placed behind the board, and when turned on in the evening, the transmitted light enables the display to be seen from the front face. For example, a method for manufacture of such signs is presented in Japanese Patent Heisei 5(1993)-229244.

However, if semi-transparent paper is simply printed on both sides, the printed matter is not displayed with much clarity, particularly during daylight hours when the light source is extinguished and the sign board is viewed by reflected light only. In this case, the display appears much too dark.

SUMMARY OF THE INVENTION

The objective of this invention is to resolve the problem described above. Specifically, this invention provides a decorative lighting material for which the printed design can be discerned with exceptional clarity, whether viewed with transmitted light or reflected light. A method for manufacturing the material is also provided.

Whether observed with transmitted light or reflected light, a printed scene is more pronounced the whiter the paper. Therefore, the entire sheet in accordance with the present invention has a brightness of at least 80%, otherwise the scene will not be pronounced.

For decorative lighting paper, the degree of light transmission from the light source determines the quantity of light and the effectiveness with which the printed matter can be observed on the other side. Therefore, the opacity of the material in accordance with the present invention is between 50–75%; if less than 50%, too much light is transmitted, and if greater than 75%, not enough light is transmitted.

For paper of the same opacity, the higher the content of a masking agent, such as titanium oxide, the higher will be its surface luster. Under reflected light, a display will look too dark, but the brightness can be easily increased by increasing the scattered reflectance, and particularly by reducing the luster of the surface layers. Then when viewed under reflected light in particular, the effect approximates that of one-sided printing. Accordingly, the luster of the material in accordance with the present invention is between 5–23%, preferably 7–20%; if less than 5–7%, the color deepens, but if higher than 20–23%, not enough white is reflected.

According to the present invention, as a means of increasing the scattered reflectance, a blend of different polymers is used, in particular polymers of low mutual compatibility, to increase the visible brightness. This can be attributed to the scattering of the light at the boundaries between polymer molecules when an admixture of different polymers in a finely dispersed state is dried and solidified. The same scattered light effect can be obtained by using for the coating solution, a mixed solvent comprised of a solvent in which the polymers are soluble, plus a high-boiling solvent in which the polymers are poorly soluble.

Paper which has a high scattered reflectance effect is characterized by low luster, and 'a=0–2' and 'b=0–3.5' when the chromaticness index is measured (JIS Z-8730) in the Hunter color system.

The film which forms the substrate for the coating should, for homogeneity and cost considerations, preferably be a transparent or semitransparent polyester or polyolefin. However, if the surface layers are set to have a scattered reflectance as described above, then an ordinary film will not have adequate bonding strength with the coating film, in which case some kind of adhesive treatment underneath the coated film is necessary. This lower bonding layer should contribute to a portion of the opacity of the paper, and so the bonding layer preferably includes an organic or inorganic filler mixed in an amount that will not affect the bonding.

However, if this type of paper is used for offset printing, static electricity may cause problems with the feeding and discharge of the paper, necessitating some kind of anti-static treatment. This can be achieved by providing an anti-static agent in the coating composition, or applied as an additional layer after the coating is dried. The first method requires the addition of a large amount of anti-static agent. Also, for a surface as used in this invention in which the surface luster has been reduced, to achieve an adequate effect, a larger amount of anti-static agent is required than for a high-luster surface.

Most anti-static agents have surface active properties, which if used in large quantities, the surface active agent causes the ink to emulsify, leaving contaminants on the printed scene. As well, for paper of this type of low surface luster, in order to reduce the frictional electrostatic charge, and in order that feeding and discharge of paper will not be impeded by static charge, it is preferable that the surface coefficient of friction be quite low (a dynamic coefficient friction of 0.6 or less, preferably 0.5).

The surface coefficient of friction can be reduced by adding a lubricating agent to the coating solution, for which a polyethylene wax, a stearamide or other amide chemical, zinc stearate or other metallic soap, or similar waxy type substance can be used. The lubricant should comprise 1–10% of the total amount of binder, preferably between 2–7%.

Paper of this invention, which enables an image printed on both sides to be easily ascertained whether observed under transparent light or reflected light, has the following properties:

| | |
|---|---|
| Opacity | 50–75% |
| Brightness as observed from the front face | ≧80% |
| Luster as observed from the front face | 5–23% |

Moreover, to achieve these properties, the coating solution is characterized by the use of:

(a) a polymer different from and of low compatibility with the main binder, and/or (b) an additional high-boiling solvent in which the main binder is poorly soluble, and the front face is comprised of a surface scattered reflectance layer of low luster.

BRIEF DESCRIPTION OF THE DRAWING FIGURES

DETAILED DESCRIPTION OF THE PREFERRED EMBODIMENTS OF THE INVENTION

Figure 1:
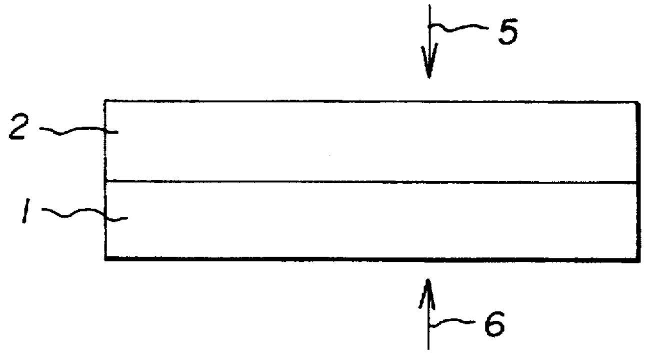
FIG. 1 is a schematic drawing of a paper in accordance with a first embodiment of the present invention.

FIG. 1 depicts a paper in accordance with the present invention, which includes a substrate 1, and a coating layer 2.

Figure 2:
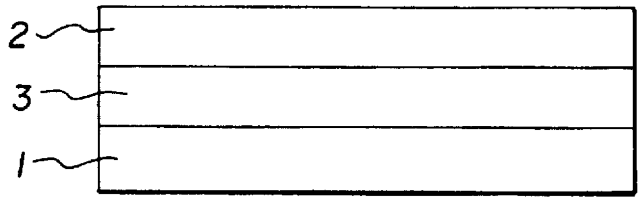
FIG. 2 is a schematic drawing of a paper in accordance with a second embodiment of the present invention.

FIG. 2 depicts a paper in accordance with the present invention, which includes a substrate 1, a bonding layer 3, and a coating layer 2.

Figure 3:
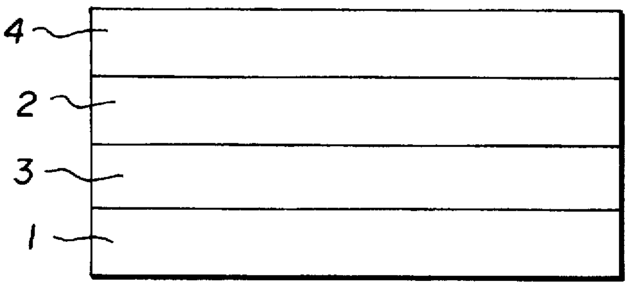
FIG. 3 is a schematic drawing of a paper in accordance with a third embodiment of the present invention.

FIG. 3 depicts a paper in accordance with the present invention, which includes a substrate 1, a bonding layer 3, a coating layer 2, and an anti-static layer 4.

The composition of the paper of this invention and in particular, the action and effect of points (a) and (b) will be explained in detail next.

The substrate must be a homogeneous, smooth, and inexpensive film, for which a polyolefin or polyester is preferable. For decorative lighting paper in particular, in view of the heat generated by the electric light, a polyester is preferable, and in terms of cost, a polyethylene terepthalate is preferable. As well, the substrate should be transparent, but a milky-white film of slight opacity can be used as long as the properties of the finished product are within the scope of this invention.

To facilitate discernibiliy of the printed matter with either transmitted light or reflected light, the entire surface is preferably fully colored, or a portion of the surface is preferably partially colored equally on both sides. Otherwise, with ordinary one-sided printing, when viewed with transmitted light, the color density is inadequate; if the color density of this portion is built up, then under reflected light, the color becomes too dense, making the image too dark.

The bonding layer (when present) is provided to bond the coating layer to the substrate, and is mainly comprised of a binder that can adhere to both the coating layer and the substrate. It must be of a thickness to compensate for the brittleness of the surface layer and must be between 0.5–10 μm, preferably between 1–5 μm.

The same types of binders can be used for the bonding layer as for the printing layer. However, the bonding layer can be of any suitable composition that will provide good bonding between the substrate and the printing layer.

The coating layer embodies the main features of this invention, and because of its brightness and luster, provides the same visual sense as a normal printed product, even if the background light is extinguished and is viewed with reflected light only. Although not confirmed, this is attributed to the fact that the scattered reflectance of the light on the front face 5 (see FIG. 1) secures brightness, and minimizes the effects on the reflected light caused by printing on the reverse face 6 (see FIG. 1).

Next, the methods to manufacture paper of the above-described properties (a) and (b) that provide the scattered reflectance layer will be explained. The thickness of this layer can be in the range of 1–30 μm, but in terms of economy and surface strength, a thickness of 2–10 μm is preferable.

(a) Preparation of light-scattering layer with polymer blend

Different polymers of low mutual compatibility are dissolved in a solvent which will totally dissolve all polymers. This solution is coated onto a substrate, then dried to produce a finely dispersed polymer blend in which light will scatter at the boundaries between the polymer molecules, and where light absorption is minimal, the brightness is high.

The main binder in the coating layer of this invention serves to assist in forming the coating layer, affixing the filler, and other purposes. The main binder can be selected from any general binder resins, but a polyester, polyurethane, acrylic-styrene copolymer, acrylonitrile-styrene copolymer, polyolefin chloride, or similar polymer is preferable.

An oleophilic resin, used as a finely dispersible secondary binder, may also be present in the coating layer. Such a binder facilitates the absorption of the printing ink, and reduces problems of migration to the reverse side, and other problems. Also, the addition of a fluorescent whitening agent is effective in increasing whiteness.

The oleophilic resin which may be used in this invention can be selected from any publicly-known resins, and preferably is a material which contains unsaturated double bonds in its molecular structure, such as an ethylene-vinyl acetate copolymer, a styrene-butadiene copolymer, an acrylic-vinyl acetate copolymer, or a methylmethacrylate-butadiene copolymer. An ethylene-vinyl acetate copolymer, or a styrene-butadiene copolymer are most preferable.

The ratio of the primary binder to oleophilic resin (when both are employed) is preferably 100:5–40, most preferably 100:5–30. A ratio of less than 5 parts oleophilic resin lowers the effectiveness of the polymer blend, and a ratio of more than 40 parts reduces the strength of the printing layer and increase the viscosity of the coating solution.

The ethylene-vinyl acetate copolymer which can optionally be used in this invention should preferably have a vinyl acetate content of between 30–50%. Otherwise, if less than 30%, there will be an insufficient number of unsaturated double bonds, thereby reducing the absorption capacity of the copolymer. Hence the vinyl acetate content is preferably more than 30%, and more preferably more than 40%. On the other hand, a copolymer of a vinyl acetate content of more than 50% will render the final polymer impractical and cannot be used. Evaflex (manufactured by Dupont-Mitsui Polychemicals Co., Ltd.) is a commercially available polymer that has these properties.

The styrene-butadiene copolymer used in this invention should preferably have a butadiene content of between 50–80%. Otherwise, if less than 50%, there will be an insufficient number of unsaturated double bonds, thereby reducing the absorption capacity of the copolymer. Hence the butadiene content is preferably more than 50%, and more preferably more than 55%. On the other hand, a butadiene content of more than 80% will render the final polymer impractical and cannot be used. Tufprene (manufactured by Asahi Chemical Industry Co., Ltd.) is a commercially available polymer that has these properties.

There are no particular restrictions on the fluorescent whitening agent used in this invention. Specific examples that can be used include Mikephor (manufactered by Mitsui Toatsu Dyes, Ltd.), or Blankophor (manufactured by Bayer AG.)

(b) Preparation of light-scattering layer with high-boiling solvent in which the main binder is poorly soluble The main binder is first dissolved in a solvent (A) or solvent blend, then a solvent of comparatively high boiling point (B) in which the main binder is poorly soluble is added to the first solution. Upon drying, the polymer will gel before the coated film is formed, and after drying, a white film of low luster will be formed.

A very white, low-luster coating layer can be obtained using this principle. For an ordinary, low-boiling solvent (A) such as ethyl acetate, methyl ethyl ketone, or toluene, then for the high-boiling poor solvent (B), diethylene glycol, ethylene glycol monoethylether, propylene glycol monoethylether, butylene glycol monoethylether, benzyl alcohol, or similar solvents can be used, where the ratio of A:B is preferably 3:22–5.

Any other publicly-known binder, filler, anti-static agent, and other agents can be used for the coating solution. There are no particular restrictions on the type of filler, but precipitated light calcium carbonate, heavy calcium carbonate, kaolin, talc, satin white, silica, titanium oxide, barium sulfate, alumina trihydrate, or other inorganic filler; or an acrylic-styrene copolymer resin, an urea resin or other organic filler can be used.

The reverse face can be the same as the front face, and it can contain an anti-static layer and/or the reverse side coating layer can contain a lubricant to prevent troubles in the feeding and discharge of the paper, or can have the properties required for offset printing, including simple UV printing.

There are no particular restrictions as to the coating method used for the decorative lighting sheets of this invention, and gravure coating, gravure reverse coating, roll reverse coating, air knife coating, lip coating, or other publicly-known coating methods are suitable. As well, there are no particular conditions for drying, but drying should preferably be within a range that will not adversely affect the properties of the coated layer and the substrate.

EXAMPLES

The measurement of characteristic values of this invention will be explained below.

(1) Brightness

Brightness is measured in accordance with JIS P-8123, in which the brightness of Hunter is measured by a brightness meter, and the value becomes the indicator of the degree of whiteness.

The higher the value, the whiter the color, where 100% is theoretically pure white, and 0% is theoretically back.

(2) Opacity

Opacity is measured in accordance with JIS P-8138, in which opacity is measured with a color sensor, and the value becomes the indicator of the degree of opacity.

The higher the value, the more opaque the product, where 100% is theoretically opaque and 0% is theoretically transparent.

(3) Luster

Luster is measured in accordance with JIS P-8142, in which luster is measured with a luster meter, and the value becomes the indicator of the degree of luster.

The higher the value, the higher the luster, where 100% is theoretically a mirror sheen. In JIS, 15% or less is unsuitable, but in reality, since luster can be measured with good reproducibility, a measured value of 15% or less can be obtained.

(4) Coefficient of friction

Coefficient of friction is measured in accordance with JIS P-8147, in which the static coefficient of friction and dynamic coefficient of friction are measured with a tensile testing apparatus (manufactured by Toyo Seiki Seisakusho, Ltd.), and the measured values are indicative of the ease-of-slip of the ink-receptive layer.

Either coefficient of friction is an absolute number, and the smaller the coefficient, the better the slip.

Example 1

A clear, 125 μm thick polyethylene terepthalate film was stretched along both axes, coated, using a gravure coater, on both sides with a solution for Formulation 1 as described below, then dried. Next, again using a gravure coater, the film was coated on both sides with a solution of Formulation 2, then dried to obtain a decorative lighting sheet. The oleophilic resin used here was a styrene-butadiene copolymer with a butadiene content of 60%.

Coating Formulation 1

| Chemical | Parts by Weight |
|---|---|
| White, polyester rotogravure ink (Lami-Z XE-White" manufactured by Osaka Printing Ink Mfg. Co., Ltd.) | 300 |
| Toluene-based solvent blend (Lami-Z Solvent, manufactured by Osaka Printing Ink Mfg. Co., Ltd.) | 150 |

Coating Formulation 2

| Chemical | Parts by Weight |
|---|---|
| White, polyolefin chloride rotogravure ink (PXAO-White, manufactured by Osaka Printing Ink Mfg. Co., Ltd.) | 300 |
| Toluene-based solvent blend (PXAO Solvent, manufactured by Osaka Printing Ink Mfg. Co., Ltd.) | 260 |
| Powdered silica (Mizukasil P-526, manufactured by Mizusawa Industrial Chemicals. Ltd.) | 15 |
| Anti-static agent (Cyastat SN, manufactured by Cyanamid International) | 4.5 |
| Styrene-butadiene copolymer (Tufprene 912, manufactured by Asahi Chemical Industry Co., Ltd.) | 12 |

Example 2

A clear, 125 μm thick polyethylene terepthalate film was stretched along both axes, coated, using a gravure coater, on both sides with a solution of Formulation 3 as described below, then dried. Next, again using a gravure coater, the film was coated on both sides with a solution of Formulation 4, then dried to obtain a decorative lighting sheet. The oleophilic resin here was a styrene-butadiene copolymer with a butadiene content of 60%.

Coating Formulation 3

| Chemical | Parts by Weight |
|---|---|
| White, polyester rotogravure ink (Multiset E-61 manufactured by Toyo Ink Mfg. Co., Ltd.) | 300 |
| Toluene-based solvent blend (LP302 Solvent, manufactured by Toyo Ink Mfg. Co., Ltd.) | 150 |

Coating Formulation 4

| Chemical | Parts by Weight |
|---|---|
| White, polyolefin chloride rotogravure ink (PXAO-White, manufactured by Osaka Printing Ink Mfg. Co., Ltd.) | 300 |
| Styrene-butadiene copolymer | 12 |

-continued

Coating Formulation 4

| Chemical | Parts by Weight |
|---|---|
| (Tufprene 912, manufactured by Asahi chemical Industry Co., Ltd.) | |
| Toluene-based solvent blend (PXAO Solvent, manufactured by Osaka Printing Ink Mfg. Co., Ltd.) | 260 |
| Powdered silica (Mizukasil P-73, manufactured by Mizusawa Industrial Chemicals, Ltd.) | 12.3 |
| Fluorescent whitening agent (Mikephor Yo, manufactured by Mitsui Toatsu Dyes, Ltd.) | 0.3 |
| Anti-static agent (Cyastat SN, manufactured by Cyanamid International) | 4.5 |
| Polyethylene wax (PE Wax, manufactured by Hoescht AG) | 4 |
| Glass beads (Microbeads, MB-20, manufactured by Toshiba-Ballotini Co., Ltd.) | 2.5 |

As shown in FIG. 1, the decorative lighting sheet so obtained is of suitable opacity and sufficient brightness.

Example 3

A clear, 125 μm thick polyethylene terepthalate film was stretched along both axes, coated, using a gravure coater, on both sides with a solution of Formulation 1 as described below, then dried. Next, again using a gravure coater, the film was coated on both sides with a solution of Formulation 5, then dried to obtain a decorative lighting sheet. The oleophilic resin here was an ethylene-vinyl acetate copolymer with a vinyl acetate content of 46%.

Coating Formulation 1

| Chemical | Parts by Weight |
|---|---|
| White, polyester rotogravure ink (Lami-Z XE-White, manufactured by Osaka Printing Ink Mfg. Co., Ltd.) | 300 |
| Toluene-based solvent blend (Lami-Z Solvent, manufactured by Osaka Printing Ink Mfg. Co., Ltd.) | 150 |

Coating Formulation 5

| Chemical | Parts by Weight |
|---|---|
| Acrylonitrile-styrene copolymer (Estyrene AS, manufactured by Nippon Steel Chemical Co., Ltd.) | 100 |
| Ethylene-vinyl acetate copolymer Evaflex 45X, manufactured by Dupont-Mitsui Polychemicals Co., Ltd.) | 19 |
| Toluene-based solvent blend (LP302 Solvent, manufactured by Toyo Ink Mfg. Co., Ltd.) | 376 |
| Ethylene glycol mono-n-butylether (Butyl glycol, manufactured by Nippon Nyukazai Co., Ltd.) | 350 |
| Powdered Silica (Mizukasil P-526 manufactured by Mizusawa Industrial Chemicals. Ltd.) | 26.6 |
| Rutile titanium dioxide (Tipaque R-670, manufactured by Ishihara Sangyo Kaisha Ltd.) | 66.6 |

-continued

Coating Formulation 5

| Chemical | Parts by Weight |
|---|---|
| Fluorescent whitening agent (Mikephor Yo, manufactured by Mitsui Toatsu Dyes, Ltd.) | 0.2 |
| Anti-static agent (Cyastat SN), manufactured by Cyanamid International) | 6.6 |

As shown in FIG. 1, the decorative lighting sheet so obtained is of suitable opacity and sufficient brightness. Good results were obtained when printed on both sides using a synthetic paper ink (Best SP, manufactured by T&K Toka Co., Ltd.)

Example 4

A clear, 125 μm thick polyethylene terepthalate film was stretched along both axes, coated using a gravure coater, on both sides with a solution of Formulation 3 as described below, then dried. Next, again using a gravure coater, the film was coated on both sides with a solution of Formulation 6, then dried to obtain a decorative lighting sheet. The oleophilic resin here was a styrene-butadiene copolymer with a butadiene content of 60%.

Coating Formulation 3

| Chemical | Parts by Weight |
|---|---|
| White, polyester rotogravure ink (Multiset E-61 manufactured by Toyo Ink Mfg. Co., Ltd.) | 300 |
| Toluene-based solvent blend (LP302 Solvent, manufactured by Toyo Ink Mfg. Co., Ltd.) | 150 |

Coating Formulation 6

| Chemical | Parts by Weight |
|---|---|
| Acrylonitrile-styrene copolymer (Estyrene AS, manufactured by Nippon Steel Chemical Co., Ltd.) | 100 |
| Styrene-butadiene copolymer (Tufprene 912, manufactured by Asahi Chemical Industry Co., Ltd.) | 8.4 |
| Toluene-based solvent blend (LP302 Solvent, manufactured by Toyo Ink Mfg. Co., Ltd.) | 340 |
| Propylene glycol monoethylether | 350 |
| Powdered silica (Mizukasil P-527 manufactured by Mizusawa Industrial Chemicals, Ltd.) | 30 |
| Rutile titanium dioxide (Tipaque R-670, manufactured by Ishihara Sangyo Kaisha Ltd.) | 45 |
| Fluorescent whitening agent (Mikephor Yo, manufactured by Mitsui Toatsu Dyes, Ltd.) | 0.2 |
| Anti-static agent (Surfynol 440, manufactured by Nisshin Chemical Industry Co., Ltd.) | 20 |
| Polyethylene wax (PE Wax, manufactured by Hoescht AG) | 3 |

As shown in FIG. 1, the decorative lighting sheet so obtained is of suitable opacity and sufficient brightness.

Example 5

A clear, 125 μm thick polyethylene terepthalate film was stretched along both axes, coated, using a gravure coater, on both sides with a solution of Formulation 1 as described above, then dried. Next, again using a gravure coater, the film was coated on both sides with a solution of Formulation 7, then dried to obtain a decorative electric lighting sheet. No oleophilic resin was used in this example. Good results were obtained upon printing both sides using a UV ink (Bestcure, manufactured by T&K Toka Co., Ltd.).

Coating Formulation 7

Same as Coating Formulation 6, except that the styrene-butadiene copolymer was removed.

Comparative Example 1

Procedure were the same as for Example 5, except that the propylene glycol monoethylether was removed, and the toluene solvent blend content was adjusted to 500 parts.

A surface luster was observed, and a printed product on both sides was prepared in the same manner as for Example 5; however in reflected light, the image was too dark and could not be readily discerned.

Effectiveness of this Invention

In the paper sheets of this invention, the surface brightness and luster are set to within a specified range, which provides a printing paper with superior visual discernibility. In particular, an independent whitening technique was used in its preparation, which was judged to be very effective in producing a decorative lighting paper with good visual discernibility in transmitted or reflected light.

Table 1 summarizes the opacity and other values obtained for each embodiment.

TABLE 1

| Example | 1 | 2 | 3 | 4 | 5 | Comparative Example 1 |
|---|---|---|---|---|---|---|
| Basis Weight ($g/m^2$) | 182 | 185 | 180 | 180 | 179 | 182 |
| Thickness (μm) | 135 | 136 | 134 | 133 | 134 | 134 |
| Brightness (%) | 81.1 | 82.9 | 83.4 | 83.6 | 80.1 | 76.5 |
| a | 0.39 | 1.16 | 0.53 | 0.92 | 1.16 | −0.55 |
| b | 0.80 | 0.15 | 2.54 | 0.76 | 0.15 | 2.88 |
| Opacity (%) | 59.7 | 66.2 | 67.8 | 61.8 | 57.5 | 71.5 |
| Luster (%) | 15.6 | 14.4 | 10.4 | 13.0 | 16.5 | 25.0 |
| Static coefficient of friction | 0.77 | 0.86 | 0.72 | 0.80 | 0.81 | 0.69 |
| Dynamic coefficient of friction | 0.42 | 0.48 | 0.36 | 0.43 | 0.42 | 0.45 |

We claim:

1. A decorative lighting paper which, when printed on both sides, the design thereof can be discerned by transmitted light and reflected by light, said paper comprising a substrate and a coating layer formed on at least one side of said substrate, the overall opacity of said paper being in the range of 50–75%, the brightness as measured from said one side is 80% or more, and the luster of said paper is 5–23%.

2. A decorative lighting paper as claimed in claim 1, wherein said coating layer comprises a binder polymer and a second polymer different from said binder polymer, said second polymer being substantially insoluble in said binder polymer.

3. A decorative lighting paper as claimed in claim 1, wherein said coating layer comprises a binder polymer, a second polymer, a first solvent in which said binder polymer and said second polymer are soluble, and a second high-boiling solvent in which said binder polymer and said second polymer are substantially insoluble.

4. A decorative lighting paper as claimed in claim 2, wherein said coating layer further comprises a secondary binder which is substantially insoluble in said binder polymer, and a fluorescent whitening agent.

5. A decorative lighting paper as claimed in claim 3, wherein said coating layer further comprises a secondary binder which is substantially insoluble said binder polymer, and a fluorescent whitening agent.

6. A decorative lighting paper as claimed in claim 5, wherein said secondary binder is an ethylene vinyl acetate copolymer and/or styrene-butadiene copolymer.

7. A decorative lighting paper as claimed in claim 1, wherein the static coefficient of friction of said paper and the dynamic coefficient of friction of said paper are such that if said paper were piled together with a second identical paper, such that said one side of said paper is in contact with a second side of said second paper, the static coefficient of friction would be no larger than 0.9 and the dynamic coefficient of friction would be no larger than 0.6.

8. A decorative lighting paper as recited in claim 1, wherein said substrate comprises a polyester or polyolefin film.

9. A decorative lighting paper as recited in claim 1, wherein said paper further comprises a bonding layer positioned between said substrate and said coating layer.

10. A decorative lighting paper as recited in claim 1, wherein said paper further comprises an anti-static layer positioned on said coating layer.

11. A method for manufacturing a decorative lighting paper, comprising applying a coating layer onto a substrate, said coating layer comprising a binder polymer and a second polymer different from said binder polymer, said second polymer being substantially insoluble in said binder polymer, the overall opacity of said paper being in the range of 50–75%, the brightness as measured from said one side is 80% or more, and the luster of said paper is 5–23%.

12. A method for manufacturing a decorative lighting paper as recited in claim 11, wherein said substrate comprises a polyester or polyolefin film.

13. A method for manufacturing a decorative lighting paper as recited in claim 11, wherein said method further comprises positioning a bonding layer between said substrate and said coating layer.

14. A method for manufacturing a decorative lighting paper as recited in claim 11, wherein said method further comprises positioning an anti-static layer on said coating layer.

15. A method for manufacturing a decorative lighting paper as claimed in claim 11, wherein said coating layer further comprises a secondary binder which is substantially insoluble in said binder polymer, and a fluorescent whitening agent.

16. A method for manufacturing a decorative lighting paper as claimed in claim 15, wherein said secondary binder is an ethylene vinyl acetate copolymer and/or styrene-butadiene copolymer.

17. A method for manufacturing a decorative lighting paper, comprising applying a coating layer onto a substrate, said coating layer comprising a binder polymer, a second polymer, a first, low-boiling solvent in which said binder polymer is soluble, and a second, high-boiling solvent in which said binder polymer is substantially insoluble, and said low-boiling solvent and said high-boiling solvent are mixed in a 3:2–5 parts by weight ratio, the overall opacity of said paper being in the range of 50–75%, the brightness as measured from said one side is 80% or more, and the luster of said paper is 5–23%.

18. A method for manufacturing a decorative lighting paper as recited in claim 17, wherein said substrate comprises a polyester or polyolefin film.

19. A method for manufacturing a decorative lighting paper as recited in claim 17, wherein said method further comprises positioning a bonding layer between said substrate and said coating layer.

20. A method for manufacturing a decorative lighting paper as recited in claim 17, wherein said method further comprises positioning an anti-static layer on said coating layer.

21. A method for manufacturing a decorative lighting paper as claimed in claim 17, wherein said coating layer further comprises a secondary binder which is substantially insoluble in said binder polymer, and a fluorescent whitening agent.

22. A method for manufacturing a decorative lighting paper as claimed in claim 21, wherein said secondary binder is an ethylene vinyl acetate copolymer and/or styrene-butadiene copolymer.

23. A method as recited in claim 17, wherein said low-boiling solvent has a boiling point of about 110° C. or lower and said high-boiling solvent has a boiling point of about 135° C. or higher.

* * * * *